United States Patent
Imanishi et al.

(10) Patent No.: US 8,390,695 B2
(45) Date of Patent: Mar. 5, 2013

(54) IMAGE CORRECTION APPARATUS AND METHOD AND METHOD OF MAKING TRANSFORMATION MAP FOR THE SAME

(75) Inventors: Masayuki Imanishi, Okazaki (JP); Hideki Ootsuka, Anjo (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 349 days.

(21) Appl. No.: 12/805,345

(22) Filed: Jul. 27, 2010

(65) Prior Publication Data
US 2011/0032374 A1 Feb. 10, 2011

(30) Foreign Application Priority Data
Aug. 6, 2009 (JP) ................................. 2009-183672

(51) Int. Cl.
*H04N 5/228* (2006.01)
(52) U.S. Cl. .................................................... 348/222.1
(58) Field of Classification Search ................. 348/222.1
See application file for complete search history.

(56) References Cited

U.S. PATENT DOCUMENTS

| | | | | |
|---|---|---|---|---|
| 6,985,171 | B1 * | 1/2006 | Kuriya et al. | 348/148 |
| 8,081,211 | B2 * | 12/2011 | Chou et al. | 348/118 |
| 8,094,170 | B2 * | 1/2012 | Kato et al. | 345/647 |
| 2006/0055776 | A1 * | 3/2006 | Nobori et al. | 348/142 |
| 2008/0309763 | A1 * | 12/2008 | Hongo | 348/148 |
| 2010/0007734 | A1 * | 1/2010 | Yamazaki et al. | 348/148 |
| 2010/0014770 | A1 * | 1/2010 | Huggett et al. | 382/260 |

FOREIGN PATENT DOCUMENTS

| | | |
|---|---|---|
| JP | 10-211849 A | 8/1998 |
| JP | 10-257482 A | 9/1998 |
| JP | 2007-28442 A | 2/2007 |

* cited by examiner

*Primary Examiner* — James Hannett
(74) *Attorney, Agent, or Firm* — Posz Law Group, PLC

(57) ABSTRACT

An image correction apparatus, an image correction method and a transformation map making method are disclosed. The apparatus includes an imaging device, a memory section, a corrected image creation section and a display device. The imaging device has an optical axis inclined upward or downward with respect to a ground surface, and captures an image. The corrected image creation section transforms the captured image into a corrected image in accordance with a transformation map stored in the memory section, thereby making a correction on inclination of a display object with respect to a vertical direction. The display device displays the corrected image.

11 Claims, 9 Drawing Sheets

CAMERA HEIGHT 0.75m

VIRTUAL VIEWPOINT A

VIRTUAL VIEWPOINT B

VIRTUAL VIEWPOINT C

CORRECTED IMAGE

CAMERA HEIGHT 1.5m

VIRTUAL VIEWPOINT A

VIRTUAL VIEWPOINT B

VIRTUAL VIEWPOINT C

CORRECTED IMAGE

VIRTUAL VIEWPOINT

COMPARISON EXAMPLE

EMBODIMENTS

COMPARISON EXAMPLE

EMBODIMENTS

OPTICAL AXIS IS PARALLEL
TO ROAD SURFACE
(CAMERA HEIGHT 0.75m)

OPTICAL AXIS IS PARALLEL
TO ROAD SURFACE
(CAMERA HEIGHT 1.5m)

DOWNWARD POINTING ANGLE
IS 25 DEGREES
(CAMERA HEIGHT 0.75m)

DOWNWARD POINTING ANGLE
IS 25 DEGREES
(CAMERA HEIGHT 1.5m)

IMAGE CORRECTION APPARATUS AND METHOD AND METHOD OF MAKING TRANSFORMATION MAP FOR THE SAME

CROSS REFERENCE TO RELATED APPLICATION

The present application is based on Japanese Patent Application No. 2009-183672 filed on Aug. 6, 2009, disclosure of which is incorporated herein by reference.

BACKGROUND OF THE INVENTION

1. Field of the Invention

The present invention relates to an image correction apparatus and an image correction method adapted to correct an image provided from an imaging device, e.g., an imaging device mounted to a vehicle to image a periphery of the vehicle. The present invention also relates to a method of making a transformation map for the image correction apparatus and method.

2. Description of Related Art

A vehicle periphery displaying apparatus is known. For example, JP-H10-257482A discloses a vehicle periphery displaying apparatus that simultaneously displays images of a left side, a right side and a rear side of the vehicle on a liquid crystal display panel. This vehicle periphery displaying apparatus takes a vehicle right side image and a vehicle left side image by using CCD (charge coupled device) cameras mounted in the vicinity of a right door mirror and a left door mirror of the vehicle. The vehicle periphery displaying apparatus takes a vehicle rear side image by using a CCD camera mounted to a rear part of the vehicle. Then, respective points of infinity of the three images (i.e., the vehicle right, left and rear side images) are made match each other, and thereby one point of infinity is set. From the three images, an image viewed from a single virtual viewpoint is synthesized.

The inventors of the present application have found that a conventional technique involves the following disadvantage, discussion on which will be given below as a related art.

When the points of infinity of the three images are made match each other in the image synthesis, a white line on a road and the like can be displayed continuously between the vehicle right/left side image and the vehicle rear side image.

Each of the CCD cameras for taking the vehicle right, left and rear side images typically has an optical axis that is set inclined downward with respect to a direction parallel to the road surface. Hence, a three dimensional (3D) object is displayed on the vehicle right/left side image and the rear side image so that the displayed 3D object has discontinuity between the vehicle right/left side image and the rear side image, resulting in incomprehensible display.

The above point will be more specifically described with reference to the drawings. An assumed situation is as follows. As shown in FIG. 4, a CCD camera is mounted to a rear part of a vehicle to image a rear side of the vehicle. On a right side and a left side on a road behind the vehicle, poles with a height of 1.5 m are provided at 2 m intervals. A distance between the CCD camera and a closest pole in a vehicle width direction is 2.6 m. The CCD camera has an angle of view of 130 degrees in the vehicle width direction.

In the above situation, if an optical axis of the CCD camera is parallel to the road surface, the poles provided on the right side and the left side of the road is imaged so as to extend in an vertical direction on the camera image (i.e., an image taken with the CCD camera), as shown in FIGS. 14A and 14B. Further, as shown in FIGS. 14A and 14B, even if the installation height of the CCD camera is changed, as long as the optical axis of the CCD camera is parallel to the road surface, the display object that should be displayed in the vertical direction is not inclined with respect to the vertical direction on the image taken with the CCD camera.

However, a CCD camera mounted to a vehicle is typically used to monitor a situation of the vicinity of the vehicle. Thus, a CCD camera is typically mounted to a vehicle so that an optical axis of the CCD camera is not parallel to the road surface but inclined downward with respect to a direction parallel to the road surface. If the optical axis of the CCD camera is inclined downward by 25 degrees with respect to the direction parallel to the road surface for example, the poles on the left side and the right side of the road are displayed so as to be inclined with respect to the vertical direction, as shown in FIGS. 15A and 15B. Angle of the inclination is larger with increasing distance from the center of the image.

Since a display object closer to an edge of the image has a larger angle of the inclination and a larger distortion, the display object closer to the edge is poorly viewable on the camera image. Furthermore, when multiple images in each which a display object closer to the edge of the image has a larger inclination are joined to each other and when the joined images are displayed, the direction of the inclination of the same display object can vary among the multiple images. The display object displayed at the border between the multiple images is poorly viewable in particular.

SUMMARY OF THE INVENTION

In view of the above and other points, it is an objective of the present invention to provide an image correction apparatus and an image correction method that can provide easily-viewable image display even if an optical axis of an imaging device is set inclined downward or upward with respect to a direction parallel to a ground surface. It is further an objective of the present invention to provide a method of making a transformation map for such image correction apparatus and method.

According to a first aspect of the present invention, an image correction apparatus is provided. The image correction apparatus includes: an imaging device, a memory section, a corrected image creation section and a display device. The imaging device has an optical axis that is set inclined upward or downward with respect to a direction parallel to a ground surface. The imaging device is configured to capture an image. The memory section stores therein a transformation map that shows a relationship in location of pixels between the captured image and a corrected image to create the corrected image from the captured image via making a correction on inclination of a display object with respect to a vertical direction perpendicular to the ground surface. The display object to be corrected is a display object that, although should be displayed in the vertical direction on the captured image, has the inclination with respect to the vertical direction on the captured image. The corrected image creation section is configured to transform location of pixels of the captured image in accordance with the transformation map stored in the memory section, thereby creating the corrected image, in which the correction has been made on the inclination of the display object with respect to the vertical direction. The display device is configured to display the corrected image created by the corrected image creation section.

According to a second aspect of the present invention, an image correction method is provided. The image correction method includes: acquiring a captured image from an imaging device having an optical axis that is set inclined downward or upward with respect to a direction parallel to a ground surface; creating a corrected image from the captured image by transforming location of pixels of the captured image in accordance with a transformation map that shows a relationship in location of pixels between the captured image and the corrected image to create the corrected image from the captured image via making a correction on inclination of a display object with respect to a vertical direction perpendicular to the ground surface, wherein the display object to be corrected is a display object that, although should be displayed in the vertical direction on the captured image, has the inclination with respect to the vertical direction on the captured image; and displaying the created corrected image.

According to the above image correction apparatus and method, the captured image is taken by the imaging device having the optical axis inclined downward or upward. The captured image is however not displayed without the correction. The captured image is transformed into the corrected image in accordance with the transformation map, and the corrected image is displayed. In the above, the transformation map shows the relationship in location of pixels between the captured image and the corrected image to provide the corrected image via making the correction on the inclination of the display object, which has the inclination with respect to the vertical direction on the captured image although should be displayed in the vertical direction on the captured image. Thus, the inclination of the display object with respect to the vertical direction has been corrected in the corrected image, which is created with use of the transformation map. Therefore, the display object is easily viewable on the corrected image. Moreover, the use of the transformation map can speed up a process of creating the corrected image. Therefore, even when the imaging device continuously takes a series of the corrected images, it is possible to continuously create and display the corrected images without an excessive time lag. The above image correction apparatus and method can provide easily-viewable image display even if an optical axis of an imaging device is set inclined downward or upward with respect to a direction parallel to a ground surface.

According to a third aspect of the present invention, a method of making a transformation map for the above image correction apparatus and the image correction method is provided. The method includes: setting multiple virtual viewpoints on a part of an image captured by an imaging device so that the multiple virtual viewpoints are set along a horizontal direction in increment of a predetermined number of pixels, wherein the part of the captured image is a part that is to be outputted as a corrected image; creating multiple virtual viewpoint images respectively from the captured image with the multiple virtual viewpoints, so that each virtual viewpoint image is made (i) have at a center thereof a corresponding one of the virtual viewpoints and (ii) have at the center thereof the display object whose inclination with respect to a vertical direction has been corrected; and determining a relationship in location of pixels between the captured image and the corrected image based on a column of pixels that lining up in the vertical direction at the center of each virtual viewpoint image, thereby creating a transformation map.

According to the above method of making a transformation map, since the virtual viewpoint image is created so as to have the virtual viewpoint at the center thereof, the inclination of the display object with respect to the vertical direction has been corrected at the location of the view viewpoint of the virtual viewpoint image. Thus, the pixels lining up in the vertical direction at a center part of the virtual viewpoint image can be utilized for creation of the corrected image. For each virtual viewpoint image, by investigating which ones of the pixels in the captured image correspond in location to the pixels lining up in the vertical direction in the virtual viewpoint image, it is possible to determine the relationship in the location of pixels between the captured image and the corrected image. A correction of all of the relationships in location of pixels determined in the above way can be the transformation map.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EXEMPLARY EMBODIMENTS

The exemplary embodiments will be described below with reference to the drawings.

(First Embodiment)

A first embodiment will be described in detail with reference to the drawings.

Figure 1:
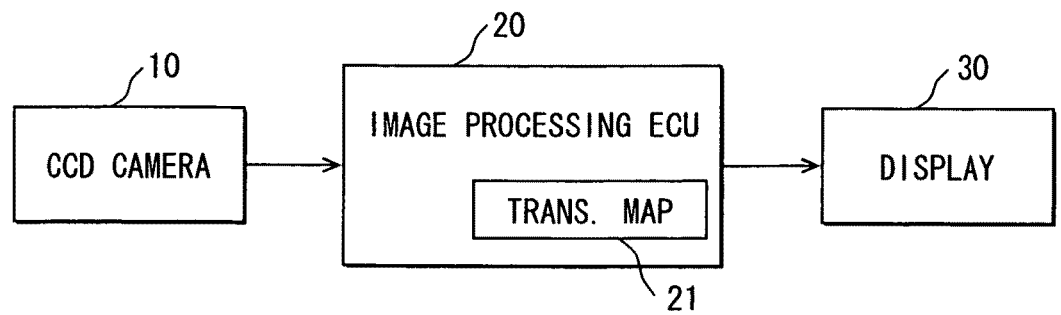
FIG. 1 is a block diagram illustrating an image correction apparatus of a first embodiment.

FIG. 1 is a block diagram illustrating an image correction apparatus of the first embodiment. In the present embodiment, explanation is given on the following example case. A CCD camera acting as an imaging device or means is mounted to a rear part of a vehicle to image a rear side of the vehicle. A correction is made on the image taken with the CCD camera.

As shown in FIG. 1, the image correction apparatus includes a CCD camera 10, an image processing electronic control unit (ECU) 20, and a display device 30.

The CCD camera 10 is mounted to a rear part of a vehicle. More specifically, the CCD camera 10 is mounted to a rear door or a trunk of the vehicle so that an optical axis of the CCD camera 10 is inclined downward with respect to a direction parallel to a ground surface. A field of view that the CCD camera 10 is to have in a rear side of the vehicle is predetermined. Thus, when the CCD camera 10 is mounted to the rear part of the vehicle, the optical axis of the CCD camera 10 is adjusted so that an actual field of view of the CCD camera 10 matches the predetermined field of view.

Alternatively, the calibration by software processing may be performed after the CCD camera 10 is mounted to the vehicle. The calibration by software processing may be performed using, for example, a predetermined board whose size, orientation, height and distance between a vehicle and a board instillation site are predetermined. The CCD camera 10 takes an image of the predetermined board located at the predetermined installation site. When the actual optical axis of the CCD camera 10 matches the target optical axis, a location of the predetermined board within the image becomes a predicted location, which is predicated based on the installation site, the size and the like of the predetermined board. In other words, when the location of the predetermined board within the image is different from the predicted location, the actual optical axis of the CCD camera 10 is deviated from the target optical axis. In this case, a transformation parameter for eliminating the difference in X and Y axes is determined, so that the location of the predetermined board within image becomes the predicted location. Then, the image taken by the CCD camera 10 is corrected using the transformation parameter. Through the above manners, it is possible to acquire the image with the predetermined field of view from the CCD camera 10. The calibration by software processing may be performed by the image processing ECU 20. It should be noted that if the calibration by the software processing is performed, the predetermined field of view is set smaller than a maximum field of view of the CCD camera 10.

Figure 2:
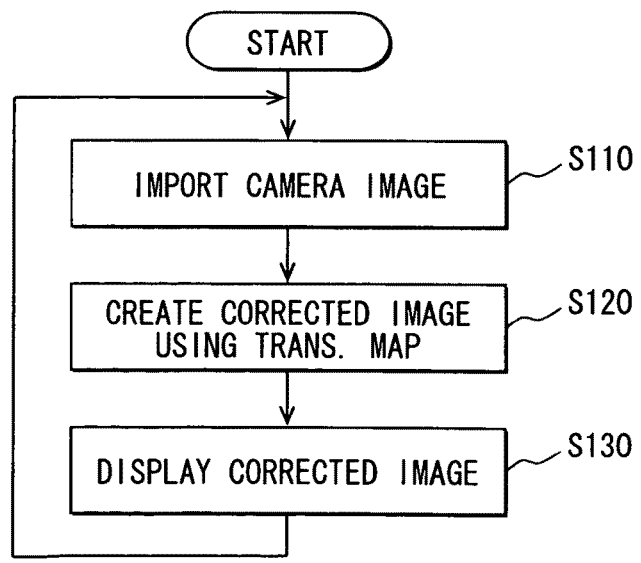
FIG. 2 is a flowchart illustrating an image correction procedure performed by the image correction apparatus illustrated in FIG. 1.

The image processing ECU 20 performs a correction process on the image outputted from the CCD camera 10 by using a transformation map 21 to create a corrected image. The image processing ECU 20 causes the display device 30 to display the corrected image. More specifically, as shown in the flowchart of FIG. 2, the image processing ECU 20 performs the following steps. At S110, the image processing ECU 20 imports the image taken with the CCD camera 10. The image processing ECU 20 imports the image, for example, at predetermined time intervals when the vehicle is backing. For simplicity, the image may be also called a camera image or a captured image. At S120, the image processing ECU 20 uses the transformation map 21 stored in an internal memory of the image processing ECU 20 to transform location of pixels of the camera image, thereby creating the corrected image. At S130, the image processing ECU 20 outputs the corrected image to the display device, e.g., a liquid crystal panel arranged in an instrument panel of the vehicle, thereby displaying the corrected image.

Now the transformation map 21 will be described. The transformation map 21 shows a relationship in location of pixels between the camera image and the corrected image to create the corrected image from the captured image via making a correction on inclination of a display object with respect to a vertical direction perpendicular to the road surface. In the above, the display object having the inclination to be corrected is a display object that, although should be displayed in the vertical direction on the camera image, has the inclination with respect to the vertical direction on the camera image. In other words, the display object to be corrected may be one that has the inclination with respect to the vertical direction on the camera image, although a physical object displayed as the display object extends in the vertical direction in an area imaged by the CCD camera. A method of making the transformation map 21 will be described in detail with reference to FIGS. 3, 4, 5A and 5B.

For explanatory purpose, let us now consider a case where: the vehicle equipped with the CCD camera 10 is traveling on a road, on a right side and a left side of which poles with a height of 1.5 m are provided at 2.0 m intervals; and the CCD camera 10 images a rear side of the vehicle. In the above case, since the optical axis of the CCD camera 10 is inclined downward with respect to a direction parallel to a road surface, the poles extending in the vertical direction are imaged on the camera image such that the poles on the camera image are inclined with respect to the vertical direction. Angle of the inclination of the pole on the camera image is larger with increasing distance from a center of the camera image.

Figure 3:
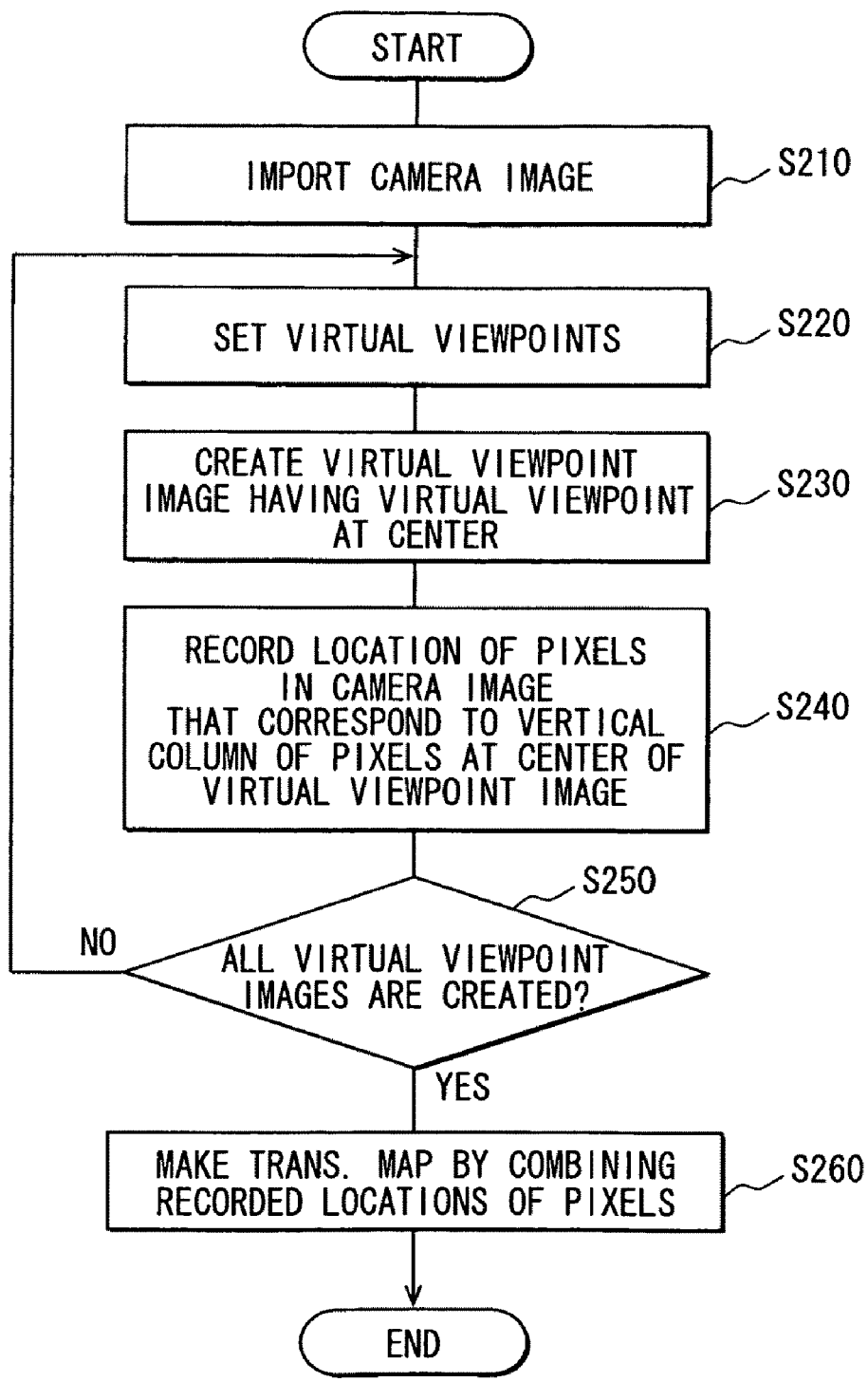
FIG. 3 is a flowchart illustrating a transformation map making method.
Figure 4:
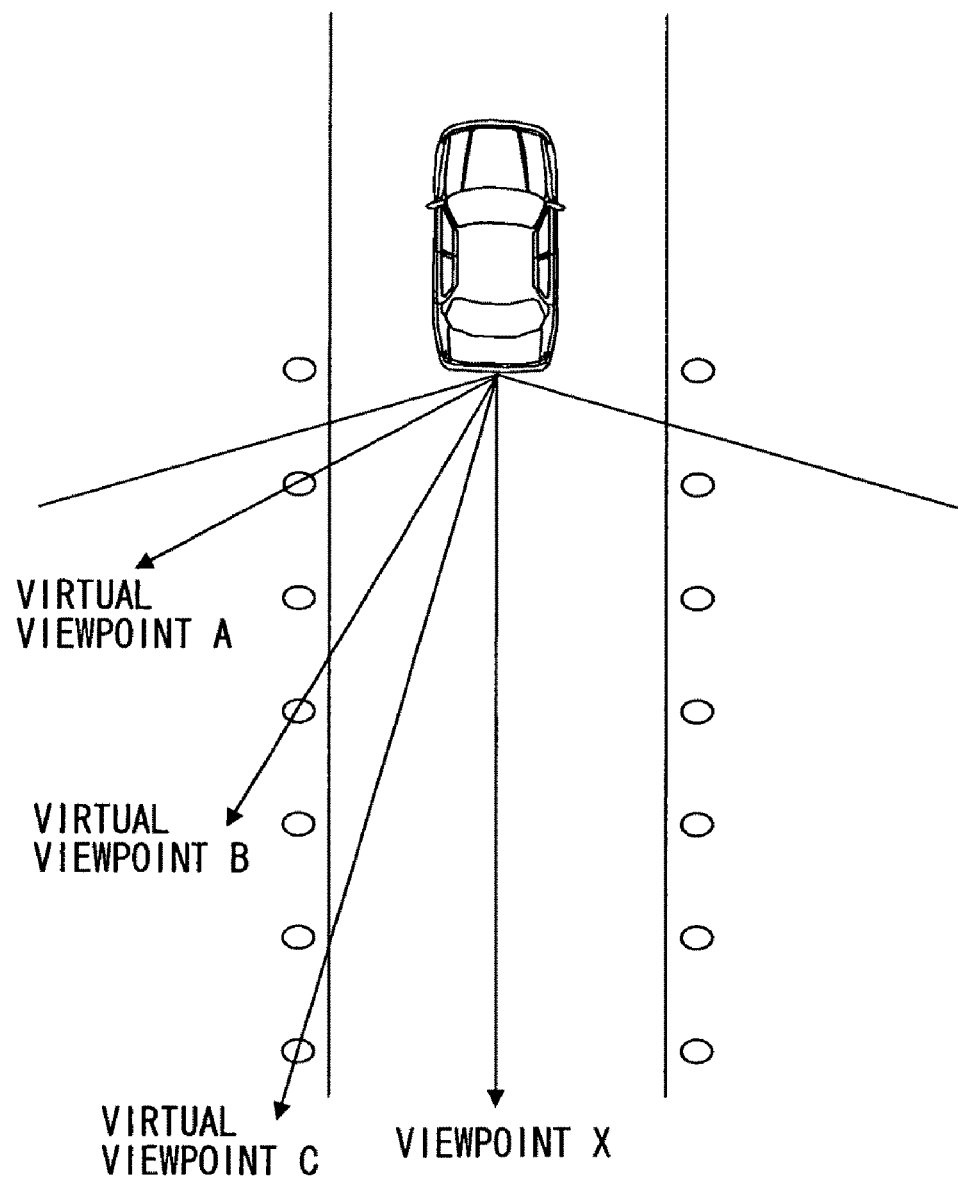
FIG. 4 is a diagram for explanation on virtual viewpoints for the transformation map making method.

Description returns to FIG. 3. At S220, multiple virtual viewpoints are set on the imported camera image, and one virtual viewpoint is selected from the multiple virtual viewpoints. More specifically, the multiple virtual viewpoints are set on a part of the camera image so that the multiple virtual viewpoints are set along a horizontal direction in increment of the predetermined number of pixels. In the above, the part of the camera image is a part that is to be outputted as the corrected image. For example, virtual viewpoints A, B and C illustrated in FIG. 4 are a part of the multiple virtual viewpoints set on the camera image. In the present embodiment, the virtual viewpoints are set along the horizontal direction in increment of one pixel. In this case, as will be more specifically described later, it is possible to create the transformation map that can make a correction on inclination at a maximum.

Figure 16:
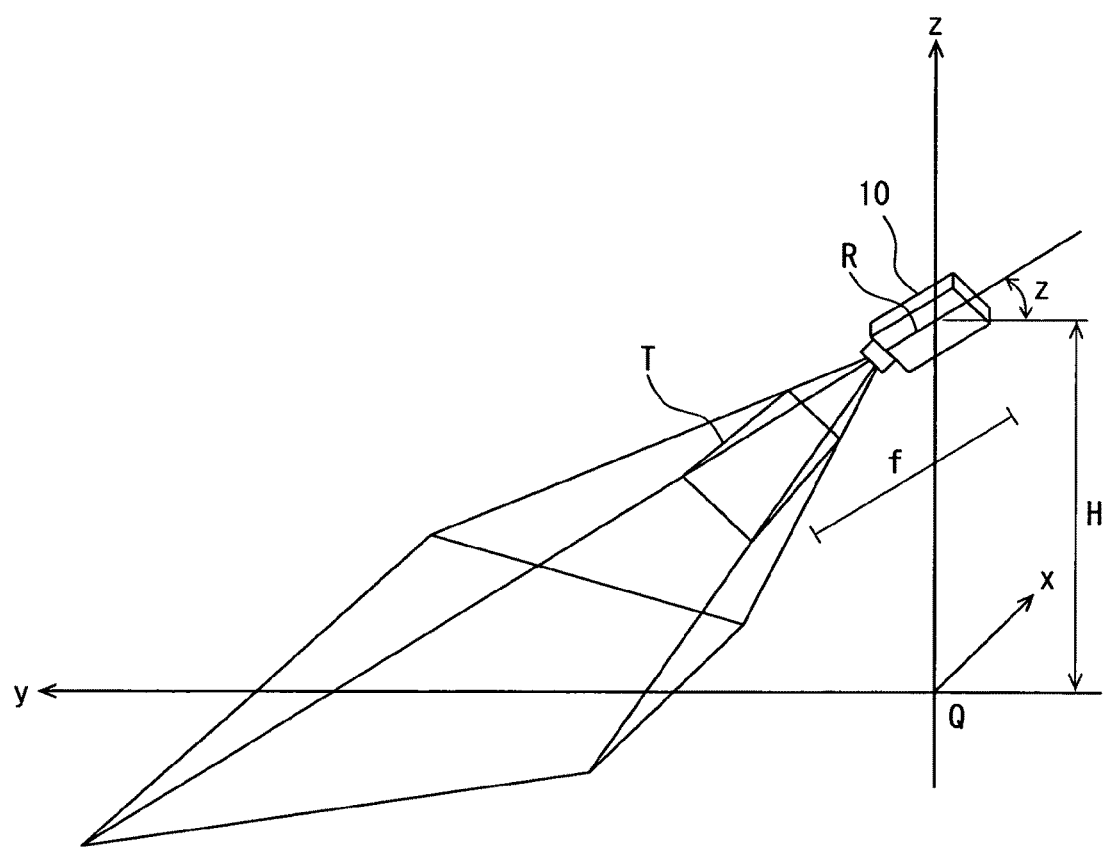
FIG. 16 is a diagram for explanation on a creation method of a birds-eye view image.

At S230, image processing is performed on the imported camera image, and thereby a virtual viewpoint image is created so that the virtual viewpoint image has at a center thereof the virtual viewpoint selected at the S220. More specifically, birds-eye view transform is performed on the camera image taken with the CCD camera 10, thereby creating a birds-eye view image. Although this birds-eye view transform is known and specifically described in JP-H10-211849A for example, brief explanation will be given below. As shown in FIG. 16, image data on a ground coordinate system (x, y, z) is projected onto a planar screen "T" located at a focal length "f" from a camera position "R". That is, perspective transformation is performed on the image data. In FIG. 16, the camera 10 is installed so to point downward at a downward pointing angle "τ".

The CCD camera 10 images a rear side of the vehicle from a viewpoint "X" that is pointing to an area directly behind the vehicle. After the birds-eye view image is created, the birds-eye view image is rotated with respect to (around) the camera position "R" in accordance with a difference in angle between the viewpoint X and the selected virtual viewpoint, until the virtual viewpoint becomes located at the original position (i.e., the position before the rotation) of the viewpoint X, in other words, until the virtual viewpoint becomes located at the horizontal direction center of the originally-created birds-eye view image.

Then, an inverse birds-eye view transform, which is inverse of the above-described birds-eye view transform, is performed on the rotated birds-eye view image. Thereby, image data on the ground coordinate system (x, y, z) is created as a virtual viewpoint image, a shown in FIG. 16.

By performing this kind of image processing on the imported camera image, it is possible to create the virtual viewpoint image, which looks like an image viewed from the selected virtual viewpoint.

Figure 5A:
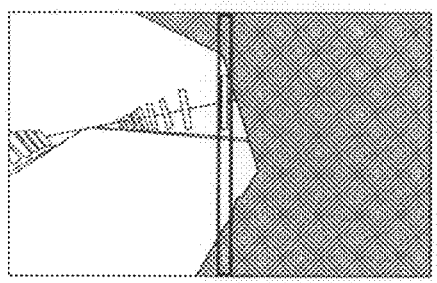
FIGS. 5A and 5B are diagrams in each of which three images from the top illustrate virtual viewpoint images, and an image at the bottom illustrates a corrected image synthesized from respective center parts of multiple virtual viewpoint images.
Figure 5A:
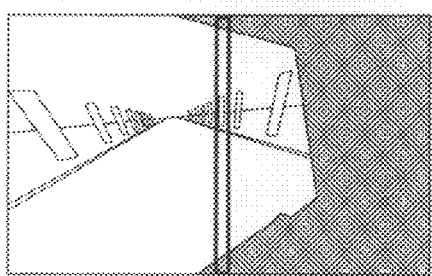
Figure 5A:
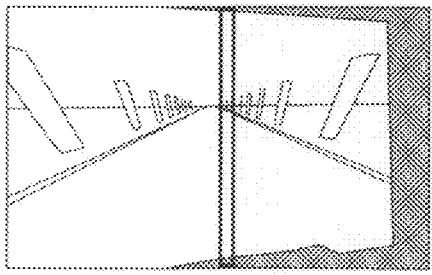
Figure 5A:
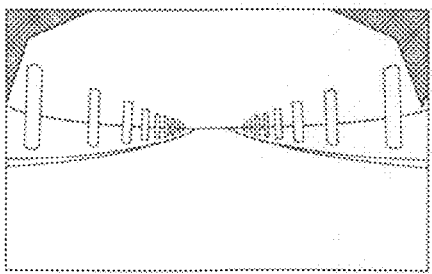
Figure 5B:
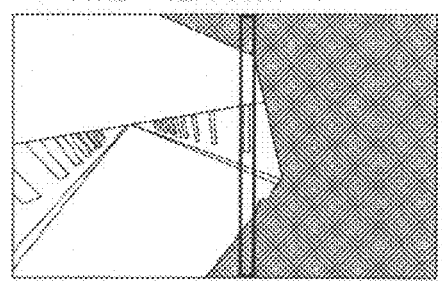
Figure 5B:
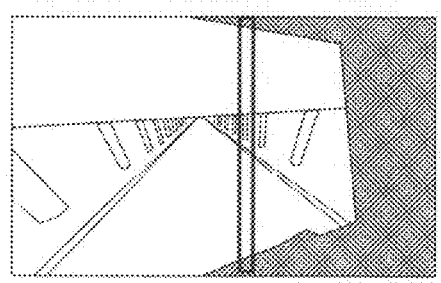
Figure 5B:
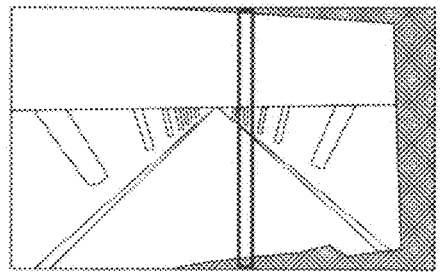
Figure 5B:
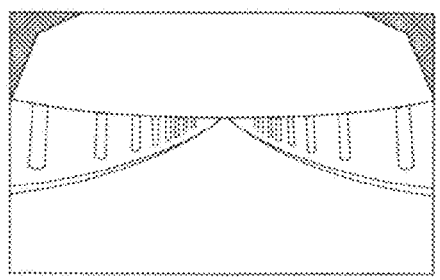

For example, three images from the top in FIG. 5A illustrate virtual viewpoint images when the installation height of the CCD camera from the road surface is 0.75 m. The virtual viewpoint images in FIG. 5A respectively correspond to the camera images viewed from the virtual viewpoints A, B and C. Three images from the top in FIG. 5B illustrate virtual viewpoint images when the installation height of the CCD camera 10 from the road surface is 1.5 m. The virtual viewpoint images in FIG. 5B respectively correspond to the camera images viewed from the virtual viewpoints A, B and C.

As can be also seen from the above virtual viewpoint images, each virtual viewpoint image has the virtual viewpoint at the center thereof. Thus, in each virtual viewpoint image, inclination of a display object with respect to the vertical direction has been corrected at a location of the virtual viewpoint. Therefore, it is possible to obtain the corrected image in which the inclination of the display object with respect to the vertical direction has been corrected, by extracting pixels lining up in the vertical direction at a center part of the virtual viewpoint image from each virtual viewpoint image and combining the pixels extracted from the multiple virtual viewpoint images with each other, as shown in the bottom image of FIG. 5A or FIG. 5B.

In the present embodiment, the virtual viewpoints are set along the horizontal direction of the camera image in increment of one pixel. From the created virtual viewpoint image corresponding to one of the virtual viewpoints, only a single column of pixels lining up in the vertical direction is extracted. If multiple columns of pixels were extracted from one virtual viewpoint image, inclination of a display object would be larger with increasing distance from the center of the image. In the present embodiment, however, since the virtual view points are set on the camera image in increment of one pixel, it is unnecessary to extract multiple columns of pixels from one virtual viewpoint image. Therefore, the present embodiment can correct the inclination at a maximum to create the corrected image. Note that when some inclination of a display object is acceptable, the virtual view points may be set in increment of two or more pixels on the camera image.

At S240, the location of pixels of the camera image that corresponds to the location of the single column of pixels lining up in the vertical direction at the center part of the virtual viewpoint image created at S230 is recorded while being associated with the virtual viewpoint. At S250, it is determined whether virtual viewpoint images corresponding to all of the set virtual viewpoints have been created. When it is determined that virtual viewpoint images corresponding to all of the set virtual viewpoints have not been created, the determination "NO" is made at S250, and the process returns to S220. In this case, a virtual viewpoint corresponding to a virtual viewpoint image that has not created yet is selected from the set virtual viewpoints. Then, the processes at S230 and later are performed.

The processes S230 to S250 are cyclically performed in the above way. When it is determined at S250 that all of the virtual viewpoint images have been created, the process proceeds to S260. At S260, the recorded locations of pixels of the camera image are combined, and thereby the transformation map for transforming the camera image into the corrected image is created.

By using the transformation map created in the above way, the location of pixels in the imported camera image can be transformed into the location of pixels in the corrected image. Thereby, it is possible to create the corrected image in which a correction has been made on the inclination of the display object, as shown in the bottom image of FIG. 5A or 5B. By displaying the corrected image, it is possible to facilitate recognition of the display object. In the present embodiment, in response to the import of the camera image to be transformed into the corrected image, pixels to be combined into the corrected, image are not extracted and synthesized according to respective virtual viewpoints. In the present embodiment, the relationship in location of pixels between the camera image and the corrected image is prospectively stored as the transformation map. In response to the import of the camera image, the corrected image is created by using the pre-stored transformation map. Thus, a process of creating the corrected image can be completed in a short time. Therefore, even when the CCD camera 10 continuously captures images for instance, it is possible to continuously create the corrected images without an excessive time lag.

(Second Embodiment)

Figure 6:
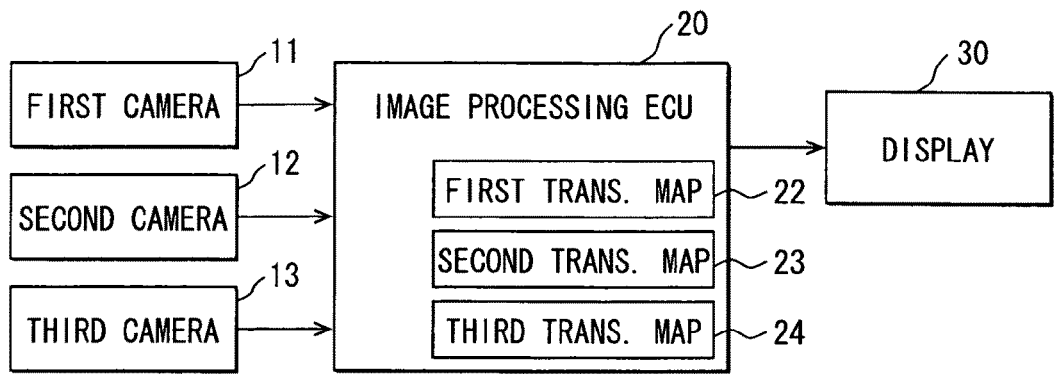
FIG. 6 is a block diagram illustrating an image correction apparatus of a second embodiment.

A second embodiment will be described. FIG. 6 is a block diagram illustrating an image creation apparatus of the second embodiment.

As shown in FIG. 6, a difference between the present embodiment and the first embodiment includes the followings. Multiple (e.g., three) CCD cameras 11 to 13 are mounted to a vehicle so that an optical axis of each CCD camera 11 to 13 points downward. An image created based on a combination of images captured by the multiple cameras 11 to 13 is displayed.

For illustrative purpose, the multiple CCD cameras 11 to 13 are assumed to be a first CCD camera 11, a second CCD camera 12, and a third CCD camera 13. The first CCD camera 11Is mounted to a rear part of the vehicle to image a rear side of the vehicle, like the CCD camera 10 of the first embodiment is. The second CCD camera 12 is mounted in the vicinity of a left door mirror of the vehicle to image an area from a left side to a left-rear side of the vehicle. The third CCD camera 13 is mounted in the vicinity of a right door mirror of the vehicle to image an area from a right side to a right rear side of the vehicle. Respective imaging ranges of the CCD cameras 11 to 13 are set so that an area shown by the image taken with the first CCD camera 11, that with the second CCD camera 12 and that with the third CCD camera 13 are in contact with other or are in part overlapping each other.

Further, the internal memory of the image processing ECU 20 stores therein multiple transformation maps. With use of the multiple transformation maps, the camera images taken with the first, second and third CCD cameras 11 to 13 are transformed into the corrected images, respectively. The location of pixels in the camera image for creation of the corrected image varies depending on the installation height of the CCD camera and the downward pointing angle of the optical axis of the CCD camera with respect to a direction parallel to the road surface. In view of the above, respective transformation maps dedicated to the multiple CCD camera 11 to 13 are prospectively created and stored in the internal memory of the image processing ECU 20.

Now, let us take the second CCD camera 12 mounted in the vicinity of the left door mirror as an example to explain a method of making a transformation map.

Figure 7:
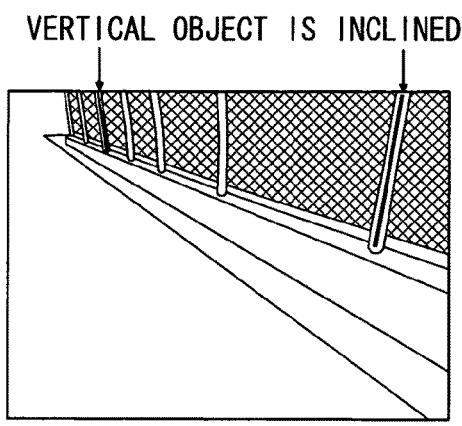
FIG. 7 is a diagram illustrating one example of an image taken with a camera mounted in the vicinity of a left door mirror of a vehicle.
Figure 8:
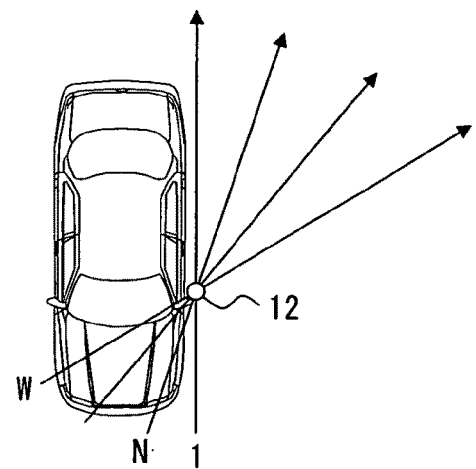
FIG. 8 is a diagram illustrating virtual viewpoints set on the camera mounted in the vicinity of the left door mirror of the vehicle.
Figure 9:
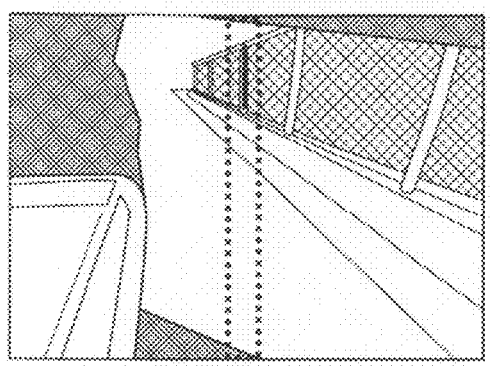
FIG. 9 is a diagram illustrating a virtual viewpoint image having a virtual viewpoint "N"

An optical axis of the CCD camera 12 mounted to the left door mirror of the vehicle is also inclined downward with respect. to a direction parallel to the road surface. Due to this downward pointing, as shown in FIG. 7, a physical object extending in the vertical direction is imaged by the CCD camera 12 so that a display object originating from the physical object is inclined with respect to the vertical direction on the camera image. In view of the above, multiple virtual viewpoints are respectively set on the camera image of the CCD camera 12 in increments of one or more pixels along the horizontal direction, as shown in FIG. 8. Then, the image processing is performed on the camera image in the manner substantially similar to that in the first embodiment, thereby creating the multiple virtual viewpoint images respectively corresponding to the multiple virtual viewpoints. For every virtual viewpoint image, the location of pixels of the camera image that corresponds to the pixels lining up in the vertical direction at the center part of the virtual viewpoint image is recorded. FIG. 9 illustrates a virtual viewpoint image viewed from a virtual viewpoint N.

Figure 10:
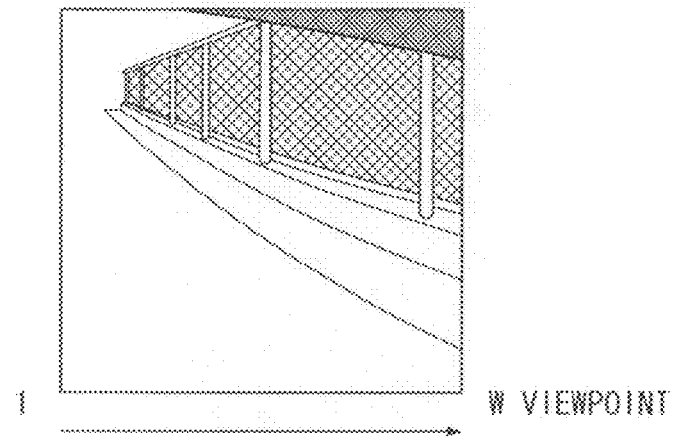
FIG. 10 is a diagram illustrating a corrected image created from the image taken with the camera mounted in the vicinity of the left door mirror.

The locations of pixels of the camera images recorded in the above way are combined in the order of the virtual viewpoints. Thereby, the transformation map corresponding to the camera image of the second CCD camera 12 can be created. When the location of pixels in the image captured by the second CCD camera 12 is transformed with use of the pre-stored transformation map, it is possible to create the corrected image, in which the inclination with respect to the vertical direction has been corrected, as shown in FIG. 10 for example.

Other configuration of the second embodiment can be the substantially same as the first embodiment.

Figure 11:
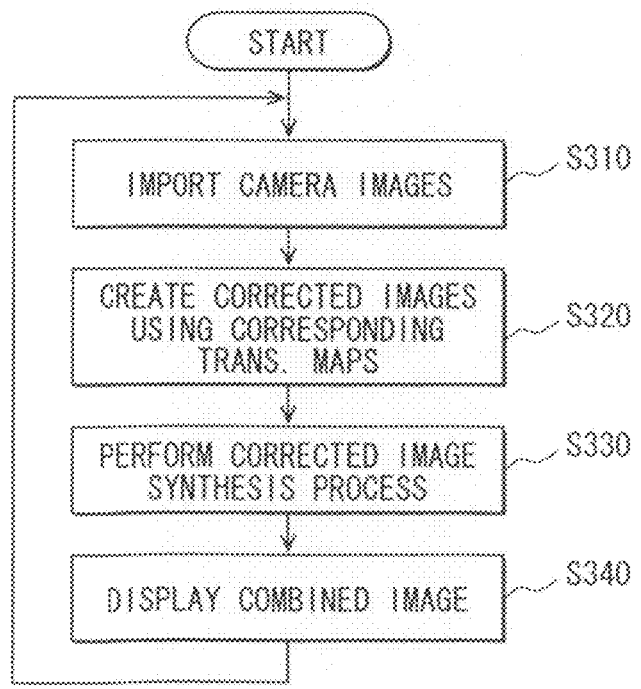
FIG. 11 is a flowchart illustrating an image correction procedure performed by the image correction apparatus illustrated in FIG. 6.

An image processing procedure of the present embodiment will be described with reference to FIG. 11. At S310, the image processing ECU 20 imports multiple camera images, which are respectively captured by the multiple CCD cameras 11 to 13. At S320, the image processing ECU 20 creates multiple corrected images from the multiple camera images by transforming the locations of pixels of the camera images with use of the transformation maps for the corresponding camera images, respectively.

At S330, the image processing ECU 20 performs a corrected image synthesis process of combining the multiple corrected images created at S320 with each other. Thereby, the mage processing ECU 20 creates a combined image, which is a combination of the multiple corrected images. At S340, the image processing ECU 20 outputs the combined image to the display device 30 and displays the combined image on the display device 30.

In the corrected image created with use of the transformation map, the inclination of the display object with respect to the vertical direction has been corrected, as described above. Thus, when the multiple corrected images combined with each other are displayed, it is possible to suppress an occurrence of discontinuity of inclination of the display object at a border between the combined corrected-images. Therefore, the present embodiment allows a user to easily recognize a display object displayed at the border.

Figure 12A:
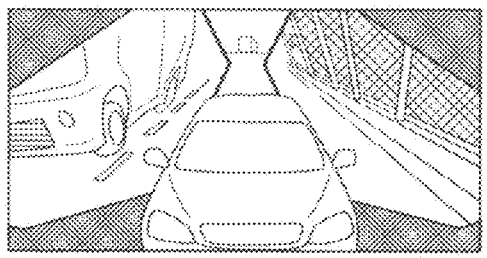
FIG. 12A is a diagram illustrating one exemplary combined image of a comparison example, the combined image being a combination of vehicle left, right and rear side images.
Figure 12B:
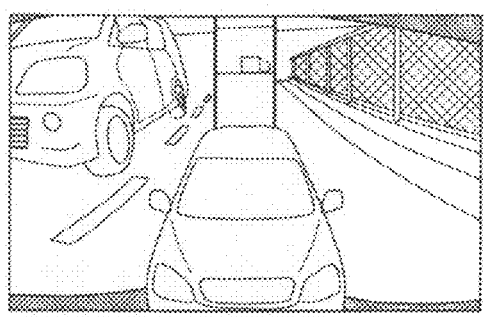
FIG. 12B is a diagram illustrating one exemplary combined image of embodiments.
Figure 13A:
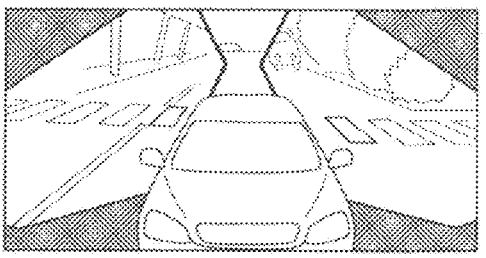
FIG. 13A is a diagram illustrating another exemplary combined image of a comparison example.
Figure 13B:
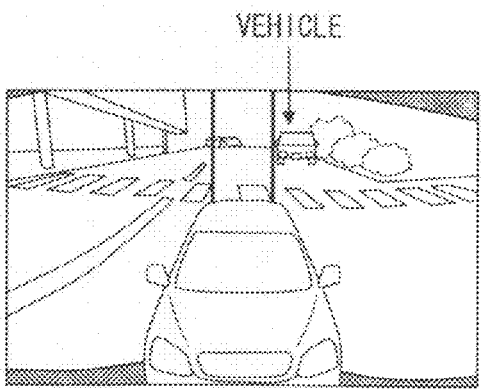
FIG. 13B is a diagram illustrating another exemplary combined image of embodiments.
Figure 14A:
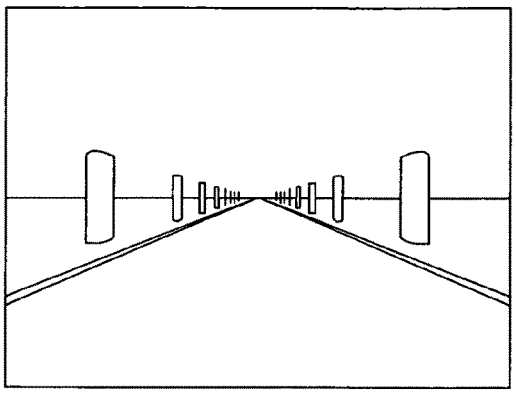
FIGS. 14A and 14B are diagrams each for explanation on how vertical poles are displayed on a camera image when an optical axis of a camera mounted to a rear part of a vehicle is parallel to a road surface.
Figure 14B:
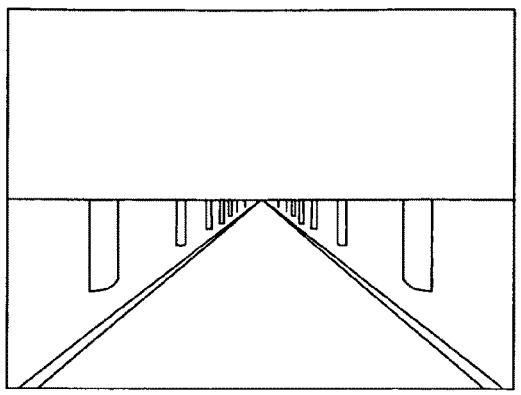
Figure 15A:
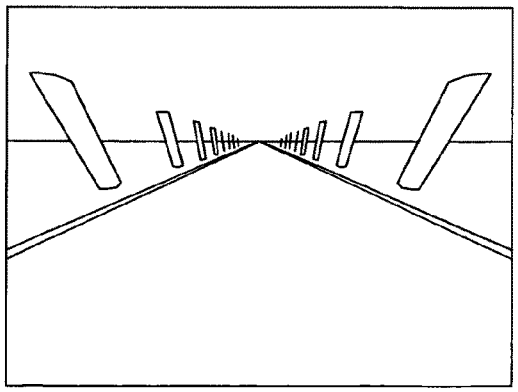
FIGS. 15A and 15B are diagrams each for explanation on how vertical poles are displayed on a camera image when an optical axis of a camera mounted to a rear part of a vehicle points downward.
Figure 15B:
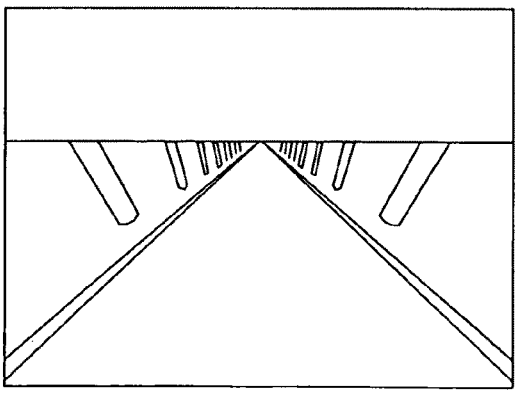

To make the above advantage more apparent, a comparison example will be described. FIG. 12A illustrates a comparison example where multiple camera images are combined with each other without the correction so that respective points of infinity of the multiple camera images match each other. In this case, a display object closer to an edge of the camera image has a larger inclination and is displayed with distortion. This makes it difficult to recognize a vehicle periphery situation. FIG. 12B illustrates on example of a vehicle periphery image of the present embodiment. In FIG. 12B, the inclination of a display object has been corrected in each corrected image, and the multiple corrected images combined with each other are displayed. The present embodiment can display the vehicle periphery situation in an easier perceivable manner. FIG. 13A illustrates a vehicle periphery image of another comparison example where a periphery vehicle exists in a left rear side of the subject vehicle. As seen from FIG. 13A, the recognition of the periphery vehicle existing distant from the subject vehicle is quite difficult from the vehicle periphery image. By contrast, in the present embodiment, a vehicle periphery image can show the periphery vehicle existing distant from the subject vehicle in an easier perceivable manner, as shown in FIG. 13B.

Now, the corrected image synthesis process performed at S330 will be more specifically described.

When the first CCD camera 11 and the second CCD camera 12 take an image of the same physical object existing rearward of the vehicle for example, the distance from the first CCD camera 11 to the physical object is different from the distance from the second CCD camera 12 to the physical object. Thus, when the corrected images are individually created by transforming the locations of pixels of the camera images taken with the first and second CCD cameras 11, 12, the same physical object in the corrected images has a different size between the corrected images.

In view of the above, in the corrected image synthesis process at S330, size of at least one of the corrected images is adjusted. More specifically, since the camera image taken with the first CCD camera 11 presents therein a physical object with a larger size than the camera image taken with the second CCD camera 12 presents, the corrected image created from the camera image taken with the first CCD camera 11 is downsized. Alternatively, the corrected image created from the camera image taken with the second CCD camera 12 may be enlarged. Alternatively, the corrected image created from the camera image taken with the first CCD camera 11 may be downsized, and the corrected image created from the camera image taken with the second CCD camera 12 may be enlarged at the same time.

After the size of the corrected image is adjusted in the above way, the multiple corrected images are combined with each other in a preset position to create the combined image. In the above, the preset position is a position that is preset so that: an area shown by one corrected image is adjoining to an area shown by another corrected image; and a display object exiting in a direction away from the vehicle has a minimum gap between the corrected images.

One method for minimizing a gap of a display object existing in the backward direction between the captured images is to determine a value for the size adjustment and the adjoining position with reference to an object that is located a predetermined distance apart from the vehicle and that is imaged at a border between the corrected images. In other words, while size of at least one of the corrected images is being adjusted, the adjoining position is determined so that the object spaced apart from the vehicle by a predetermined distance can be displayed continuously at the border between the corrected images. According to the above manner, the object spaced a predetermined distance apart from the vehicle can be displayed continuously at the border between the corrected images.

In the above case, objects other than the object spaced a predetermined distance apart have difference sizes at the border between the multiple corrected images, causing a display gap. This display gap is larger as a difference between a distance to the object and the predetermine distance is larger, whereas the display gap is smaller with increasing distance from the vehicle. Since the display gap occurs regarding objects other than the object located at the predetermined distance, it may be preferable that the predetermined distance be set to a most preferential distance (e.g., 20 m), where an object is to be detected preferentially. In this case, the object located at the distance to be preferentially detected has the same size between the corrected images, and the display gap does not occur. Thus, it is possible to provide easily perceivable display.

The predetermined distance may be settable by a user. In accordance with the predetermined distance set by a user, the size of at least one of the corrected images and the position at which the corrected images are adjoining may be changed. In this case, the size of the adjusted corrected image and the adjoining position are prospectively set and stored in the internal memory of the image processing ECU 20 as being an image synthesis map.

Alternatively, a physical object detection device for detecting a distance to a physical object in a periphery of a vehicle such as a laser sensor, a millimeter wave sensor and the like may be mounted to the vehicle and may be connected with the image correction apparatus. In accordance with the distance to the physical object detected by the physical object detection device, the size of at least one of the corrected images and the position at which the corrected images are adjoined to each other may be changed so that the detected physical object at the distance is displayed continuously between the corrected images.

When the physical object detection device is used to detect a distance to a physical object, the size of the corrected image and the adjoining position are adjusted and changed in accordance with the detected distance to the physical object. In this case, it is possible to prevent a display object from having difference sizes and display gaps at a border between corrected images, regardless of a distance to a physical object displayed as the display object.

When the physical object detection device detects multiple objects at difference distances from the vehicle, it may be preferable that the adjoining position be changed and the size of at least one of the corrected images be adjusted in accordance with the distance to one of the multiple physical objects that is closest to the vehicle among the multiple physical objects. According to the above manner, priority can be given to a physical object that is close to the vehicle and has a higher degree of influence on driving the vehicle. It is possible to display the combined image from which such object is easily perceivable.

When the physical object detection device does not detect any object in the periphery of the vehicle, it may be preferable that the corrected images be combined with each other so that a traffic lane line indicative of a traffic lane is displayed continuously between the combined corrected images. In the above case, the corrected images may be combined with each other in a predetermined adjoining position and in predetermines size of the corrected images. Through the above manner, it is possible to improve the apparent continuity between the multiple corrected images.

The above-described embodiments can be modified in various ways, examples of which will be described below.

In the above embodiments, the image correction apparatus is used to correct an image captured by a CCD camera (acting as an imaging device or means) mounted to a vehicle to image a periphery of the vehicle. Alternatively, the image correction apparatus may be used to correct, for example, an image captured by a camera that images an inside of a building or a property to monitor the inside of the building or the property for an intruder or the like.

In the above embodiments, explanation is given on a case where a camera is installed to have a downward pointing direction, which is downward with respect to a direction parallel to the ground surface. The above embodiments are also applicable to a case where a camera is installed to have an upward pointing direction. This is because when a camera is installed to have an upward pointing direction, a display object can be also inclined with respect to a vertical direction on a camera image although a physical object imaged as the display object is not inclined with respect to a vertical direction.

In the above embodiments and modifications, the CCD camera 10, 11, 12, 13 can act as an imaging device or means. The image processing ECU 20 having an internal memory can act as a memory section or means, a corrected image creation section or means, a combined image creation section or means. The display device 30 can act as a display means.

According to a first aspect of embodiments, an image correction apparatus is provided. The image correction apparatus includes: an imaging device, a memory section, a corrected image creation section and a display device. The imaging device has an optical axis that is set inclined upward or downward with respect to a direction parallel to a ground surface. The imaging device is configured to capture an image. The memory section stores therein a transformation map that shows a relationship in location of pixels between the captured image and a corrected image to create the corrected image from the captured image via making a correction on inclination of a display object with respect to a vertical direction perpendicular to the ground surface. The display object to be corrected is a display object that, although should be displayed in the vertical direction on the captured image, has the inclination with respect to the vertical direction on the captured image. The corrected image creation section is configured to transform location of pixels of the captured image in accordance with the transformation map stored in the memory section, thereby creating the corrected image, in which the correction has been made on the inclination of the display object with respect to the vertical direction. The display device is configured to display the corrected image created by the corrected image creation section.

According to the above image correction apparatus, the captured image is taken with the imaging device having the optical axis inclined downward or upward takes. The captured image is however not displayed without the correction. The captured image is transformed into the corrected image in accordance with the transformation map, and the corrected image is displayed. In the above, the transformation map shows the relationship in location of pixels between the captured image and the corrected image to provide the corrected image via making the correction on the inclination of the display object, which has the inclination with respect to the vertical direction on the captured image although should be displayed in the vertical direction on the captured image. Thus, the inclination of the display object with respect to the vertical direction has been corrected in the corrected image, which is created with use of the transformation map. Therefore, the display object is easily viewable on the corrected image. Moreover, the use of the transformation map can speed up a process of creating the corrected image. Therefore, even when the imaging device continuously takes a series of the corrected images, it is possible to continuously create and display the corrected images without an excessive time lag. The above image correction apparatus and method can provide easily-viewable image display even if an optical axis of an imaging device is set inclined downward or upward with respect to a direction parallel to a ground surface.

The image correction apparatus may be configured such that the imaging device is mounted to a vehicle to image a periphery of the vehicle. In other words, the above image correction apparatus may be used for a vehicle. This is one of preferable applications because a typical imaging device mounted to a vehicle is used for monitoring a periphery of the vehicle and has an optical axis inclined downward with respect to a direction parallel to a road surface.

The image correction apparatus may be configured in the following way. The imaging device may be multiple imaging devices. The multiple imaging devices may be mounted to different parts of a vehicle so that respective areas imaged by the multiple imaging devices are at least adjoining to each other. The memory section may store therein multiple transformation maps so that the multiple transformation maps are respectively associated with the multiple imaging devices to transform the locations of pixels of the multiple captured images taken with the multiple imaging devices. The corrected image creation section may create multiple corrected images from the multiple captured images in accordance with the multiple transformation maps, respectively. The image correction apparatus may further include a combined image creation section configured to combine the corrected images with each other to create a combined image. The display device may display the combined image.

As described above, the inclination of the display object with respect to the vertical direction has been corrected in the corrected image created with use of the transformation map. Thus, even when multiple images are displayed by being combined with or joined to each other, it is possible to suppress inclination discontinuity of the display object at a border between the multiple combined or joined multiple images by using the multiple corrected images as the combined or joined multiple images. Therefore, the display object displayed at the border is easily viewable.

The image correction apparatus may be configured such that: the combined image creation section combines the multiple corrected images with each other through adjusting size of at least one of the multiple corrected images so that a physical object (i) spaced a predetermined distance apart from the vehicle and (ii) located at a place corresponding to a border between the multiple corrected images is displayed continuously at the border between the multiple corrected images.

When the multiple imaging devices image the same physical object, the distance to the physical object may vary among the multiple imaging devices because the multiple imaging devices are mounted to different parts of the vehicle. For example, when the multiple imaging devices are respectively mounted to a rear part of the vehicle, in the vicinity of a right door mirror and in the vicinity of a left door mirror, the distance to a physical object existing in a rear side of the vehicle varies between the imaging device mounted to the rear of the vehicle and the imaging device mounted in the vicinity of the left or right door mirror. Because of the above distance variation, the multiple corrected images, which are respectively created via the transformation of the locations of pixels of the multiple captured images taken with the multiple imaging devices, may display the same physical object with different sizes. In view of the above, the above image correction apparatus adjusts at least one of the multiple corrected images. In the above manner, the physical object spaced apart from the vehicle by the predetermined distance can be displayed continuously at the boarder between the multiple corrected images.

When the size of at least one of the multiple display objects is adjusted so that a certain physical object spaced apart from the vehicle by the predetermined distance is displayed continuously at the boarder between the multiple corrected images, another physical object at other distances than the predetermined distance may be displayed to have a size gap at the border between the multiple corrected images. The size gap may be larger as a difference between the distance to another object and the predetermined distance is larger, but the size gap may be smaller as a distance from the vehicle is larger. Because the size gap may occur on the physical object located at distances other than the predetermined distance, it may be preferable that the predetermined distance be set to a most preferential distance (e.g., 20 m), at which a physical object is to be detected preferentially. The predetermined distance may be settable by a user.

The image correction apparatus may be alternatively configured in the following way. The image correction apparatus may be connected with a physical object detection device that is mounted to the vehicle to detect a distance to a physical object existing in a periphery of the vehicle. The combined image creation section combines the multiple corrected images with each other through adjusting size of at least one of the multiple corrected images in accordance with the detected distance to the physical object so that the physical object at the detected distance is displayed continuously between the multiple corrected images. According to the above configuration, by using the physical object detection device, it is possible to adjust the corrected image in accordance with the-distance to the detected physical object. Thus, it is possible to suppress the size gap of the display object at the boarder between the multiple corrected images regardless of the distance to the physical object The image correction apparatus may be configured such that: when multiple physical objects located at different distances from the vehicle is detected by the physical object detection device, the combined image creation section adjusts the size of the at least one of the multiple corrected images in accordance with the detected distance to one of the multiple physical objects that is closest to the vehicle among the physical objects. According to the above configuration, priority can be given to the physical object that is located close to the vehicle and that can have a high degree of influence on driving the vehicle. Such physical object can be displayed in an easily viewable manner.

The image correction apparatus may be configured such that: when the physical object detection device fails to detect the physical object in the periphery of the vehicle, the combined image creation section combines the multiple corrected images with each other so that a traffic lane line indicative of a lane is displayed continuously at a border between the multiple corrected images. The above image correction apparatus can improve the apparent continuity between the multiple corrected images.

According to a second aspect, an image correction method is provided. The image correction method includes: an image acquisition step of acquiring an image from captured by an imaging device having an optical axis that is set inclined downward or upward with respect to a direction parallel to a ground surface; a corrected image creation step of creating a corrected image from the captured image by transforming location of pixels of the captured image in accordance with a transformation map that shows a relationship in location of pixels between the captured image and the corrected image to create the corrected image from the captured image via making a correction on inclination of a display object with respect to a vertical direction perpendicular to the ground surface, wherein the display object to be corrected is a display object that, although should be displayed in the vertical direction on the captured image, has the inclination with respect to the vertical direction on the captured image; and a display step of displaying the corrected image created at the corrected image creation step.

The above image correction method may be as follows. In the image acquisition step, multiple captured images may be respectively acquired from multiple imaging devices each having the optical axis that is set inclined downward or upward with respect to the direction parallel to the ground surface. The imaging devices may be mounted to different parts of a vehicle so that respective areas imaged by the imaging devices are at least adjoining to each other. The transformation map may be multiple transformation maps that are respectively associated with the multiple imaging devices to transform the locations of pixels of respective captured images taken with the multiple imaging devices. In the corrected image creation step, multiple corrected images may be created from the multiple captured images in accordance with the multiple transformation maps, respectively. The image correction method may further include a combined image creation step of combining the corrected images with each other to create a combined image. In the display step, the combined image is displayed.

The above image correction method may be as follows. In the combined image creation step, size of at least one of the corrected images may be adjusted so that a physical object (i) spaced a predetermined distance apart from the vehicle and (ii) located at a place corresponding to a border between the corrected images is displayed continuously at the border between the corrected images.

Alternatively, the image correction method may further include a physical object detection step of detecting a distance to a physical object existing in a periphery of the vehicle. In the combined image creation step, size of at least one of the corrected images is adjusted in accordance with the detected distance to the physical object so that the physical object at the detected distance is displayed continuously between the corrected images.

The above image correction method may be as follows. In the combined image creation step, the size of the at least one of the corrected images is adjusted in accordance with the detected distance to one of multiple physical objects that is located closest to the vehicle among the physical objects when the multi physical objects located at different distances from the vehicle is detected in the physical object detection step.

The image correction method may be as follows. In the combined image creation step, the corrected images are combined with each other so that a traffic lane line indicative of a lane is displayed continuously at a border between the corrected images when the physical object in the periphery of the vehicle is not detected in the physical object detection step.

The above image correction methods can involve the substantially same advantages as the above image correction apparatuses.

According to a third aspect, a method of making a transformation map for the above image correction apparatus and the above image correction method is provided. The method includes: a virtual viewpoint setting step of setting multiple virtual viewpoints on a part of an image captured by an imaging device so that the multiple virtual viewpoints are set along a horizontal direction in increment of a predetermined number of pixels, wherein the part of the captured image is a part that is to be outputted as a corrected image; a virtual viewpoint image creation step of creating multiple virtual viewpoint images respectively from the captured image with the multiple virtual viewpoints, so that each virtual viewpoint image is made (i) have at a center thereof a corresponding one of the virtual viewpoints and (ii) have at the center thereof the display object whose inclination with respect to a vertical direction has been corrected; and a map creation step of determining a relationship in location of pixels between the captured image and the corrected image based on a column of pixels that lining up in the vertical direction at the center of each virtual viewpoint image, thereby creating a transformation map.

According to the above method of making a transformation map, since the virtual viewpoint image is created so as to have the virtual viewpoint at the center thereof, the inclination of the display object with respect to the vertical direction has been corrected at the location of the view viewpoint of the virtual viewpoint image. Thus, the pixels lining up in the vertical direction at a center part of the virtual viewpoint image can be utilized for creation of the corrected image. For each virtual viewpoint image, by investigating which ones of the pixels in the captured image correspond in location to the pixels lining up in the vertical direction in the virtual viewpoint image, it is possible to determine the relationship in the location of pixels between the captured image and the corrected image. A correction of all of the relationships in location of pixels determined in the above way can be the transformation map.

The above method of making a transformation map may be as follows. The virtual viewpoint image creation step includes a birds-eye view transform step of performing birds-eye view transform on the captured image thereby to create a birds-eye view image from the captured image; a birds-eye view image rotation step of rotating the birds-eye view image with respect to position of the imaging device in accordance with an difference in angle between the virtual viewpoint and an actual viewpoint from which the captured image is taken with the imaging device, so that the rotated birds-eye view image has, at the center thereof, the virtual viewpoint; and an inverse birds-eye view transform step of performing inverse birds-eye view transform on the rotated birds-eye view image thereby to create the birds-eye view image, wherein the inverse birds-eye view transform in the inverse birds-eye view transform step is inverse of the birds-eye view transform in the birds-eye view transform step. According the above way, after the captured image is transformed into the birds-eye view image, the rotated birds-eye view image having the virtual viewpoint at the center thereof is inversely transformed. In this way, it is possible to provide the virtual viewpoint image, in which the inclination of the vertical object at the virtual viewpoint has been properly corrected.

In the above method of making a transformation map, the virtual viewpoints may be set along the horizontal direction in increment of one pixel. In this case, it is possible to make the transformation map that can correct the inclination of the display object at a maximum.

While the invention has been described above with reference to various embodiments thereof, it is to be understood that the invention is not limited to the above described embodiments and constructions. The invention is intended to cover various modifications and equivalent arrangements.

What is claimed is:

1. An image correction apparatus comprising:
an imaging device configured to capture an image, with an optical axis thereof being set inclined upward or downward with respect to a direction parallel to a ground surface;
a memory section storing therein a transformation map that shows a relationship in location of pixels between the captured image and a corrected image to create the corrected image from the captured image via making a correction on inclination of a display object with respect to a vertical direction perpendicular to the ground surface, wherein the display object having the inclination to be corrected is a display object that, although should be displayed in the vertical direction on the captured image, has the inclination with respect to the vertical direction on the captured image;
a corrected image creation section configured to transform location of pixels of the captured image in accordance with the transformation map stored in the memory section, thereby creating the corrected image, in which the correction has been made on the inclination of the display object with respect to the vertical direction;
a display device configured to display the corrected image created by the corrected image creation section, wherein
the imaging device is mounted to a vehicle to image a periphery of the vehicle,
the imaging device is a plurality of imaging devices,
the imaging devices are mounted to different parts of the vehicle so that respective areas imaged by the imaging devices are at least adjoining to each other,
the memory section stores therein a plurality of transformation maps so that the transformation maps are respectively associated with the imaging devices to transform the locations of pixels of the captured images taken with the imaging devices,
the corrected image creation section creates a plurality of corrected images from the captured images in accordance with the transformation maps, respectively,
the image correction apparatus further comprising a combined image creation section configured to combine the corrected images with each other to create a combined image,
the display device displays the combined image, and
the combined image creation section combines the corrected images with each other through adjusting size of at least one of the corrected images so that a physical object (i) spaced a predetermined distance apart from the vehicle and (ii) located at a place corresponding to a border between the corrected images is displayed continuously at the border between the corrected images.

2. An image correction apparatus comprising:
an imaging device configured to capture an image, with an optical axis thereof being set inclined upward or downward with respect to a direction parallel to a ground surface;
a memory section storing therein a transformation map that shows a relationship in location of pixels between the captured image and a corrected image to create the corrected image from the captured image via making a correction on inclination of a display object with respect to a vertical direction perpendicular to the ground surface, wherein the display object having the inclination to be corrected is a display object that, although should be displayed in the vertical direction on the captured image, has the inclination with respect to the vertical direction on the captured image;
a corrected image creation section configured to transform location of pixels of the captured image in accordance with the transformation map stored in the memory section, thereby creating the corrected image, in which the correction has been made on the inclination of the display object with respect to the vertical direction;
a display device configured to display the corrected image created by the corrected image creation section, wherein
the imaging device is mounted to a vehicle to image a periphery of the vehicle,
the imaging device is a plurality of imaging devices,
the imaging devices are mounted to different parts of the vehicle so that respective areas imaged by the imaging devices are at least adjoining to each other,
the memory section stores therein a plurality of transformation maps so that the transformation maps are respectively associated with the imaging devices to transform the locations of pixels of the captured images taken with the imaging devices,
the corrected image creation section creates a plurality of corrected images from the captured images in accordance with the transformation maps, respectively,
the image correction apparatus further comprising a combined image creation section configured to combine the corrected images with each other to create a combined image,
the display device displays the combined image,
the image correction apparatus is connected with a physical object detection device that is mounted to the vehicle to detect a distance to a physical object existing in a periphery of the vehicle, and
the combined image creation section combines the corrected images with each other through adjusting size of at least one of the corrected images in accordance with the detected distance to the physical object so that the physical object at the detected distance is displayed continuously between the corrected images.

3. The image correction apparatus according to claim 2, wherein:
when a plurality of physical objects located at different distances from the vehicle is detected by the physical object detection device, the combined image creation section adjusts the size of the at least one of the corrected images in accordance with the detected distance to one of the physical objects, the one being closest to the vehicle among the physical objects.

4. The image correction apparatus according to claim 2, wherein:
when the physical object detection device fails to detect the physical object in the periphery of the vehicle, the combined image creation section combines the corrected images with each other so that a traffic lane line indicative of a lane is displayed continuously at a border between the corrected images.

5. An image correction method comprising:
acquiring an image captured by an imaging device having an optical axis that is set inclined downward or upward with respect to a direction parallel to a ground surface;
creating a corrected image from the captured image by transforming location of pixels of the captured image in accordance with a transformation map that shows a relationship in location of pixels between the captured image and the corrected image to create the corrected image from the captured image via making a correction on inclination of a display object with respect to a vertical direction perpendicular to the ground surface, wherein the display object having the inclination to be corrected is a display object that, although should be displayed in the vertical direction on the captured image, has the inclination with respect to the vertical direction on the captured image; and displaying the created corrected image, wherein the acquiring the captured image includes acquiring, a plurality of captured images respectively from a plurality of imaging devices each having the optical axis that is set inclined downward or upward with respect to the direction parallel to the ground surface, wherein the imaging devices are mounted to different parts of a vehicle so that respective areas imaged by the imaging devices are at least adjoining to each other, and the transformation map is a plurality of transformation maps that are respectively associated with the imaging devices to transform the locations of pixels of the captured images taken with the imaging devices, and the creating the corrected image includes creating a plurality of corrected images from the captured images in accordance with the transformation maps, respectively, the image correction method further comprising:

combining the corrected images with each other to create a combined image; and displaying the combined image, wherein the combining the corrected images with each other includes adjusting size of at least one of the corrected images so that a physical object (i) spaced a predetermined distance apart from the vehicle and (ii) located at a place corresponding to a border between the corrected images is displayed continuously at the border between the corrected images.

6. An image correction method comprising:

acquiring an image captured by an imaging device having an optical axis that is set inclined downward or upward with respect to a direction parallel to a ground surface;

creating a corrected image from the captured image by transforming location of pixels of the captured image in accordance with a transformation map that shows a relationship in location of pixels between the captured image and the corrected image to create the corrected image from the captured image via making a correction on inclination of a display object with respect to a vertical direction perpendicular to the ground surface, wherein the display object having the inclination to be corrected is a display object that, although should be displayed in the vertical direction on the captured image, has the inclination with respect to the vertical direction on the captured image; and displaying the created corrected image, wherein:

the acquiring the captured image includes acquiring, a plurality of captured images respectively from a plurality of imaging devices each having the optical axis that is set inclined downward or upward with respect to the direction parallel to the ground surface, wherein the imaging devices are mounted to different parts of a vehicle so that respective areas imaged by the imaging devices are at least adjoining to each other, and the transformation map is a plurality of transformation maps that are respectively associated with the imaging devices to transform the locations of pixels of the captured images taken with the imaging devices, and the creating the corrected image includes creating a plurality of corrected images from the captured images in accordance with the transformation maps, respectively, the image correction method further comprising:

combining the corrected images with each other to create a combined image;

displaying the combined image; and detecting a distance to a physical object existing in a periphery of the vehicle, wherein the combining the corrected images with each other includes adjusting size of at least one of the corrected images in accordance with the detected distance to the physical object so that the physical object at the detected distance is displayed continuously between the corrected images.

7. The image correction method according to claim 6, wherein the combining the corrected images with each other further includes:

when a plurality of physical objects located at different distances from the vehicle is detected, adjusting the size of the at least one of the corrected images in accordance with the detected distance to one of the physical objects, the one being located closest to the vehicle among the physical objects.

8. The image correction method according to claim 6, wherein the combining the corrected images with each other further includes:

when the physical object is not detected in the periphery of the vehicle, combining the corrected images with each other so that a traffic lane line indicative of a lane is displayed continuously at a border between the corrected images.

9. In an image correction apparatus comprising an imaging device configured to capture an image, with an optical axis thereof being set inclined upward or downward with respect to a direction parallel to a ground surface, a memory section storing therein a transformation map that shows a relationship in location of pixels between the captured image and a corrected image to create the corrected image from the captured image via making a correction on inclination of a display object with respect to a vertical direction perpendicular to the ground surface, wherein the display object having the inclination to be corrected is a display object that, although should be displayed in the vertical direction on the captured image, has the inclination with respect to the vertical direction on the captured image, a corrected image creation section configured to transform location of pixels of the captured image in accordance with the transformation map stored in the memory section, thereby creating the corrected image, in which the correction has been made on the inclination of the display object with respect to the vertical direction, and a display device configured to display the corrected image created by the corrected image creation section, a method of making the transformation map comprising:

setting a plurality of virtual viewpoints on a part of an image captured by an imaging device so that the virtual viewpoints are set along a horizontal direction in increment of a predetermined number of pixels, wherein the part of the captured image is a part that is to be outputted as a corrected image;

creating a plurality of virtual viewpoint images respectively from the captured image with the virtual viewpoints, so that each virtual viewpoint image is made (i) have at a center thereof a corresponding one of the virtual viewpoints and (ii) have at the center thereof the display object whose inclination with respect to a vertical direction has been corrected; and determining a relationship in location of pixels between the captured image and the corrected image based on pixels that lining up in the vertical direction at a center part of each virtual viewpoint image, thereby creating a transformation map.

10. The method according to claim 9, wherein
the creating each virtual viewpoint image includes:
performing birds-eye view transform on the captured image thereby to create a birds-eye view image from the captured image;

rotating the birds-eye view image with respect to position of the imaging device in accordance with an difference in angle between the virtual viewpoint and an actual viewpoint from which the captured image is taken with the imaging device, so that the rotated birds-eye view image has, at the center thereof, the virtual viewpoint; and performing inverse birds-eye view transform on the rotated birds-eye view image thereby to create the birds-eye view image, wherein the inverse birds-eye view transform is inverse of the birds-eye view transform.

11. The method according to claim 9, wherein:
the virtual viewpoints are set along the horizontal direction in increment of one pixel.

* * * * *